United States Patent [19]
Nielsen et al.

[11] Patent Number: 5,835,083
[45] Date of Patent: Nov. 10, 1998

[54] EYETRACK-DRIVEN ILLUMINATION AND INFORMATION DISPLAY

[75] Inventors: Jakob Nielsen, Atherton; Bruce Tognazzini, Woodside; Bob Glass, Los Gatos, all of Calif.

[73] Assignee: Sun Microsystems, Inc., Palo Alto, Calif.

[21] Appl. No.: 655,134

[22] Filed: May 30, 1996

[51] Int. Cl.⁶ .................................................. G09G 5/00
[52] U.S. Cl. ........................................ 345/211; 364/707
[58] Field of Search ........................... 348/730; 364/707; 345/211, 1–2, 156, 214; 340/825.69, 825.72

[56] References Cited

U.S. PATENT DOCUMENTS

| | | | |
|---|---|---|---|
| 5,008,946 | 4/1991 | Ando | 382/2 |
| 5,046,027 | 9/1991 | Taaffe et al. | 345/1 |
| 5,059,961 | 10/1991 | Cheng | 340/720 |
| 5,396,443 | 3/1995 | Mese et al. | 364/707 |
| 5,483,464 | 1/1996 | Song | 364/707 |
| 5,635,948 | 6/1997 | Tonosaki | 345/211 |

FOREIGN PATENT DOCUMENTS

| 3837620 | 4/1989 | Germany | 345/156 |
|---|---|---|---|
| 5-011713 | 1/1993 | Japan | 345/214 |

OTHER PUBLICATIONS

Dixon, Cleveland and Nancy Cleveland, Eyegaze Eyetracking System, Jan. 29–31, 1992.

Arne John Glenstrup, Theo Engell–Nielsen, Eye Controlled Media: Present and Future State, Jun. 1, 1995, pp. 1–45.

Forward Eyetracker, SRI Homepage at http://www.sri.com, Apr. 30, 1996.

Jacob Nielsen, Noncommand User Interfaces, Communications of the ACM, Apr. 1993/vol. 36.No. 4, pp. 83–99.

Joseph A. Lahoud and Dixon Cleveland LC Technologies Inc. The Eyegaze Eytracking System Unique Example of Multiple Use Technology May 23–26, 1994.

*Primary Examiner*—Lun-Yi Lao
*Attorney, Agent, or Firm*—McDermott, Will & Emery

[57] ABSTRACT

An eyetracker is used to control power to an electrical device such as a computer display screen so that power consumption is reduced when a user's eyes and therefore a user's attention are not directed to the device. A motion detector activates a proximity detector and/or an IR detector to ensure that power is applied only when a user is actually present.

7 Claims, 8 Drawing Sheets

EYETRACK-DRIVEN ILLUMINATION AND INFORMATION DISPLAY

BACKGROUND OF THE INVENTION

1. Field of the Invention

The invention relates to controlling power consumption in electrical devices having a finite source of energy, such as battery driven devices and, more particularly, to controlling power consumption in the use of computer displays.

2. Description of Related Art

Computer displays face a problem that if some types of display are left running for a long period of time with a particular image formed on the screen, each portion of the image formed on the screen would become more or less permanently etched into the screen. CRT displays are particularly susceptible to this problem.

Screen savers were developed to minimize this type of occurrence. A screen saver program is loaded and activated if a period of time elapses during which nothing is typed or no mouse movement is detected. In short, when a computer is left unattended with no activity, a screen saver would blacken the screen totally, except, perhaps, for a moving display which would cross the screen in an irregular pattern so that the same pattern would not be displayed at the same location on the screen for extended periods of time.

Flat panel displays, and other types of display also utilize screen saver programs in part to equalize the on and off times of driver circuit elements so that certain driver circuits or light emitting elements were not utilized substantially more than others, aging more rapidly and becoming thus more prone to failure.

Eyetracking devices are known particularly in conjunction with heads up displays in certain control applications in aircraft. An eyetracker device monitors the eyes of a user and calculates the direction in which the user is looking and, in some applications, the particular point in three dimensional space on which the user's eyes focus.

One commercial eyetracker is the Dual-Purkinje-Image (DPI) Eyetracker, manufactured by Forward Optical Technologies, Inc. of El Chaon, Calif. It determines the direction of gaze over a large two dimensional visual field with great accuracy and without any attachments to the eye. It operates with infra-red light which is invisible to the subject and does not interfere with normal vision. The eyetracker has a pointing accuracy on the order of one minute of arc and response time on the order of one millisecond. One can utilize the DPI Eyetracker with an infra-red optometer to allow a continuous measure of eye focus, producing a three dimensional eyetracker.

The Problems

The prior art has failed to adequately address the need for controlling power consumption in electrical devices having a finite source of energy, e.g. in battery driven devices such as computer displays. In such devices, power is frequently wasted by permitting the device to continue to run even though no user is in the vicinity. In the context of a computer display, display power is certainly wasted if no one is looking at the display. In addition, in the prior art, when a screen saver switches on, and the screen suddenly goes black, a user, in the vicinity of the display, has his attention abruptly distracted toward the screen which switched off.

There is thus a need for improving the control of power consumption in electrical devices, particularly in computer displays. There is also a need for improving the way in which screen savers are activated.

SUMMARY OF THE INVENTION

The present invention provides apparatus, processes, systems and computer program products which have the overcome the problems of the prior art. This is achieved by detecting when a user's attention is directed to the electrical device and reducing the power consumption when his attention is not so directed. It is also directed to detecting the absence of a user in the vicinity of the electrical device and shutting down power consumption to an even greater level when that occurs. When a user returns, power is automatically reapplied.

The invention is directed to apparatus for automatically applying power to an electrical device, including a motion detector, a proximity detector and an optional infrared (IR) detector, activated by the motion detector's detecting motion, and a switch connected to a source of power and to the electrical device and controlled by the motion detector and the proximity detector for applying power to the electrical device when the proximity detector detects an object within a predetermined distance from the electrical device while it is activated by the motion detector. A power off timer, activated when power is applied to the electrical device, is reset by the motion detector's detecting motion. It may be used for controlling the switch to remove power from the electrical device when the timer times out.

The invention is also directed to a computing device having a processor, a display having a controllable intensity, an eyetracker providing a signal indicating where a user's eyes are looking and a control for changing intensity of the display based on that signal. The control reduces the intensity gradually when a user looks away from the display so as not to distract the user. When the user's eyes return to the display for a predetermined period of time, the control reestablishes the intensity level of the display in effect before the user looked away. The user's eyes returning to the display can be an instantaneous return, an return to the screen for a predetermined time interval or when the user's eyes fix on a particular point on the screen. Alternatively, the intensity level can be reestablished when the user's eyes begin to move toward the display. Power to the eyetracker is removed when the user has not looked at the display for a predetermined period of time.

The invention also relates to a method for automatically applying power to an electrical device, by detecting motion, by detecting proximity of objects to the device; and by applying power to the device when an object is within a predetermined distance from the electrical device within a predetermined period of time after motion has been detected.

The invention also relates to a method of controlling intensity of images on a display, by detecting where a user's eyes are looking and by changing intensity of images on the display based on where a user's eyes are looking.

The invention is also directed to a computer system including a network, a plurality of computers connected to the network, one of which is a computer equipped with a motion detector a proximity detector activated by the motion detector detecting motion; and a switch connected to a source of power and to the electrical device and controlled by the motion detector and the proximity detector for applying power to the at least a particular one of the plurality of computers when the proximity detector detects an object within a predetermined distance from the computer.

The invention is also directed to computer program products each including a memory medium and containing one or more computer programs and data used to implement the above methods, apparatus and systems.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

The objects, features and advantages of the system of the present invention will be apparent from the following description in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1:
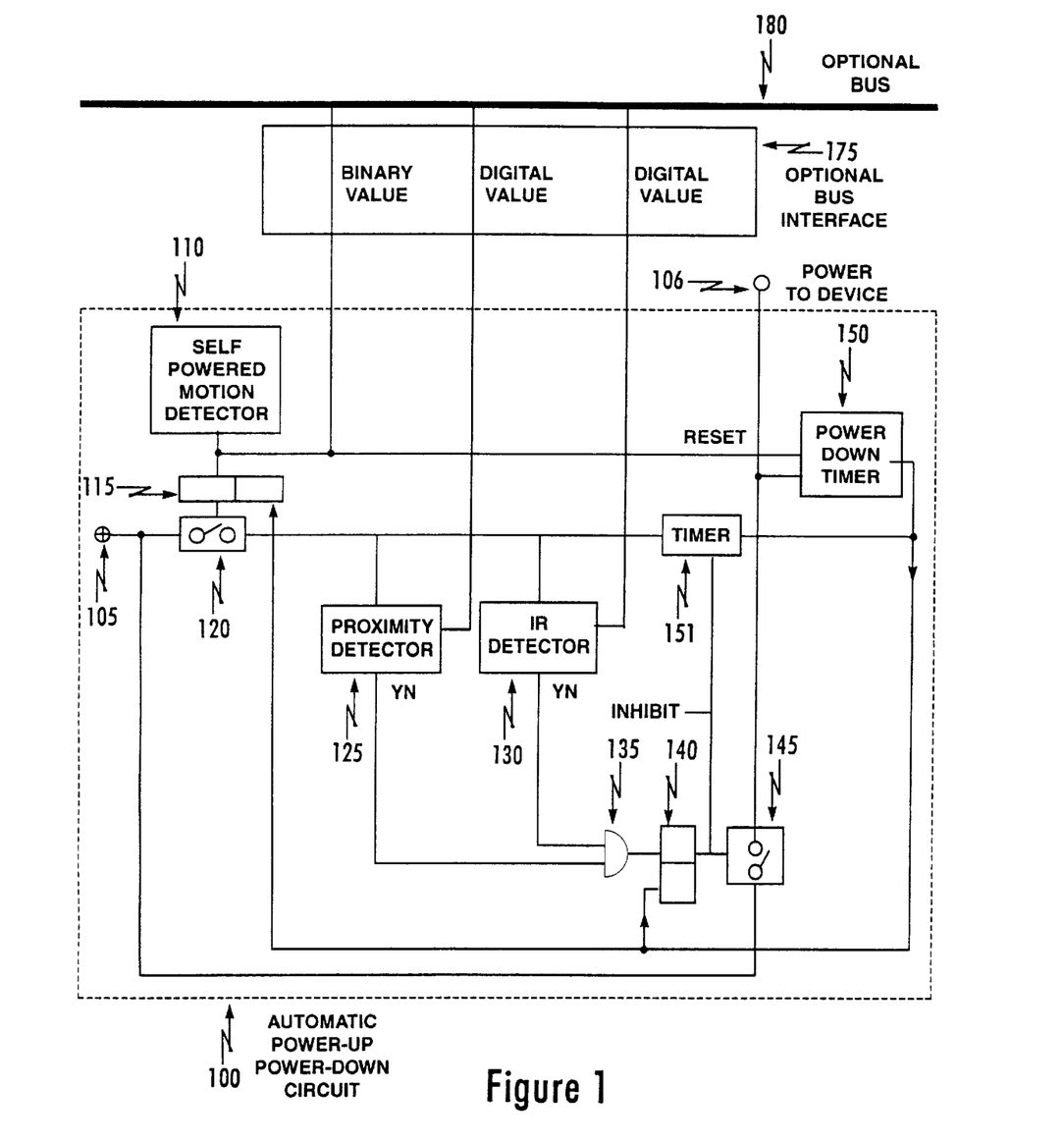
FIG. 1 illustrates apparatus for automatically powering up and powering down an electrical device having an optional interface to a computer bus.

FIG. 1 depicts an apparatus for automatically powering up and powering down an electrical device in accordance with the invention. An automatic power-up, power-down circuit 100 is shown optionally connected to bus 180 over optional bus interface 175. The automatic power-up, power-down circuit connects a source of power 105 to an output terminal 106 powering the electrical device as described more hereinafter. A self-powered motion detector 110, detects motion in the vicinity of the electrical device. When motion is detected a bistable device 115 is set to close switch 120 to power-up proximity detector 125 and IR detector 130. With these detectors powered up, if the motion detected by motion detector 110 is within a certain proximity of the electrical device and if the amount of infra-red radiation emitted by the object detected is adequate, that is, above a certain threshold, both inputs to AND gate 135 are activated, setting bistable 140 which then closes switch 145 permitting power from source 105 to go to electrical device over terminal 106. With the application of power, power-down timer 150 begins timing, counting down from a certain value. Any motion in the vicinity of the electrical device will trigger a motion detector periodically resulting in reset of the power-down timer. However, when a period of time goes by with no motion detected, one may assume that a user has left the area and eventually power-down timer 150 will time out, resetting bistables 140 and 115, thus turning off power to the electrical device at terminal 106 and turning off power to the proximity detector 125 and the infra-red detector 130. As the user walks back toward the electrical device, the motion detector will first sense the presence and power-up proximity detector and infra-red detectors 125 and 130 respectively and the cycle begins again.

Motion detector 110 can not distinguish between motion caused by a large object at a far distance or a small object at a close distance. Proximity detector 125 can distinguish how close an object is and also whether or not the object is closer than a particular threshold. The infra-red detector detects whether or not the moving object within a certain proximity is a living object or not, and, based on the amount of infra-red radiation, can determine the approximate size of the object. By using all three of these detectors, one may ensure that a human operator is close enough to the electrical device to want to use it. Under those conditions, the electrical device is powered-up.

The optional bus interface 175 and the optional computer bus 180 are used as discussed hereinafter for activating computer display screens.

The infra-red detector can also be utilized to distinguish the situation in which the computer is being carried by a person from one in which a motion results from a person approaching. If a person is approaching, the IR intensity will be increasing, whereas if the device is being carried, the IR levels will remain constant.

Figure 2A:
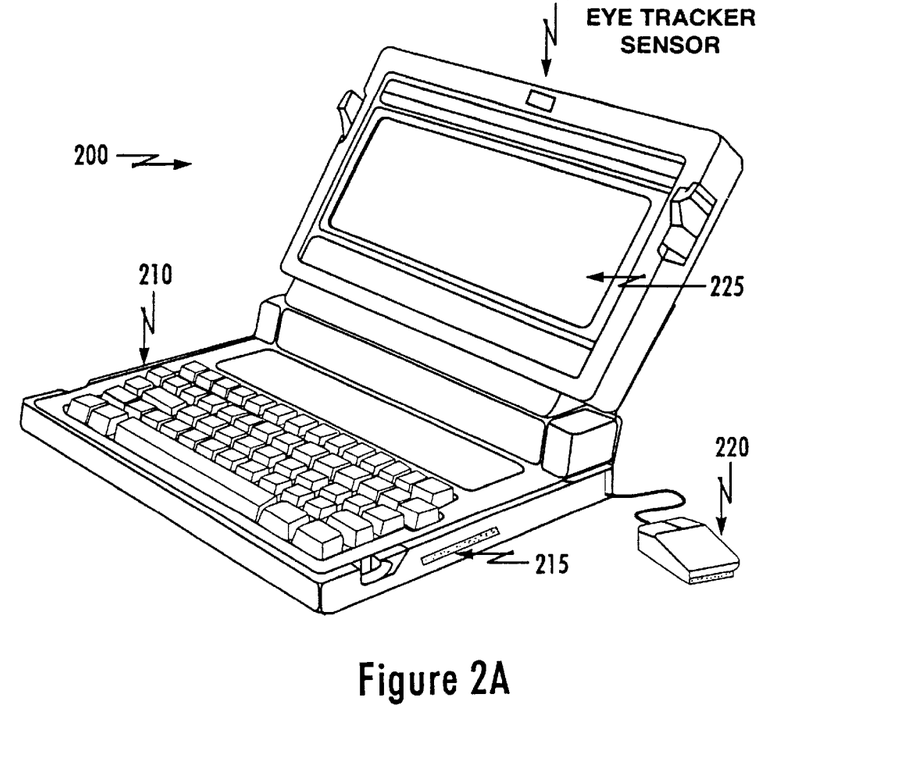
FIG. 2A is an illustration of a computer which is selectively battery operated and suitable for use with the invention.

FIG. 2A is an illustration of a computer which is selectively battery powered and suitable for use with the invention. The illustration of the computer corresponds to any one of a variety of standard battery powered portable computers 200. Such computers typically have a keyboard 210 which is exposed when open, a disc drive 215, a mouse 220, which may be incorporated into the keyboard, and a display 225 for displaying output from the processor. In accordance with the invention, an eyetracker sensor is shown at 230, positioned so as to be able to view the user's eyes. The use of the eyetracker sensor will be described more hereinafter.

Figure 2B:
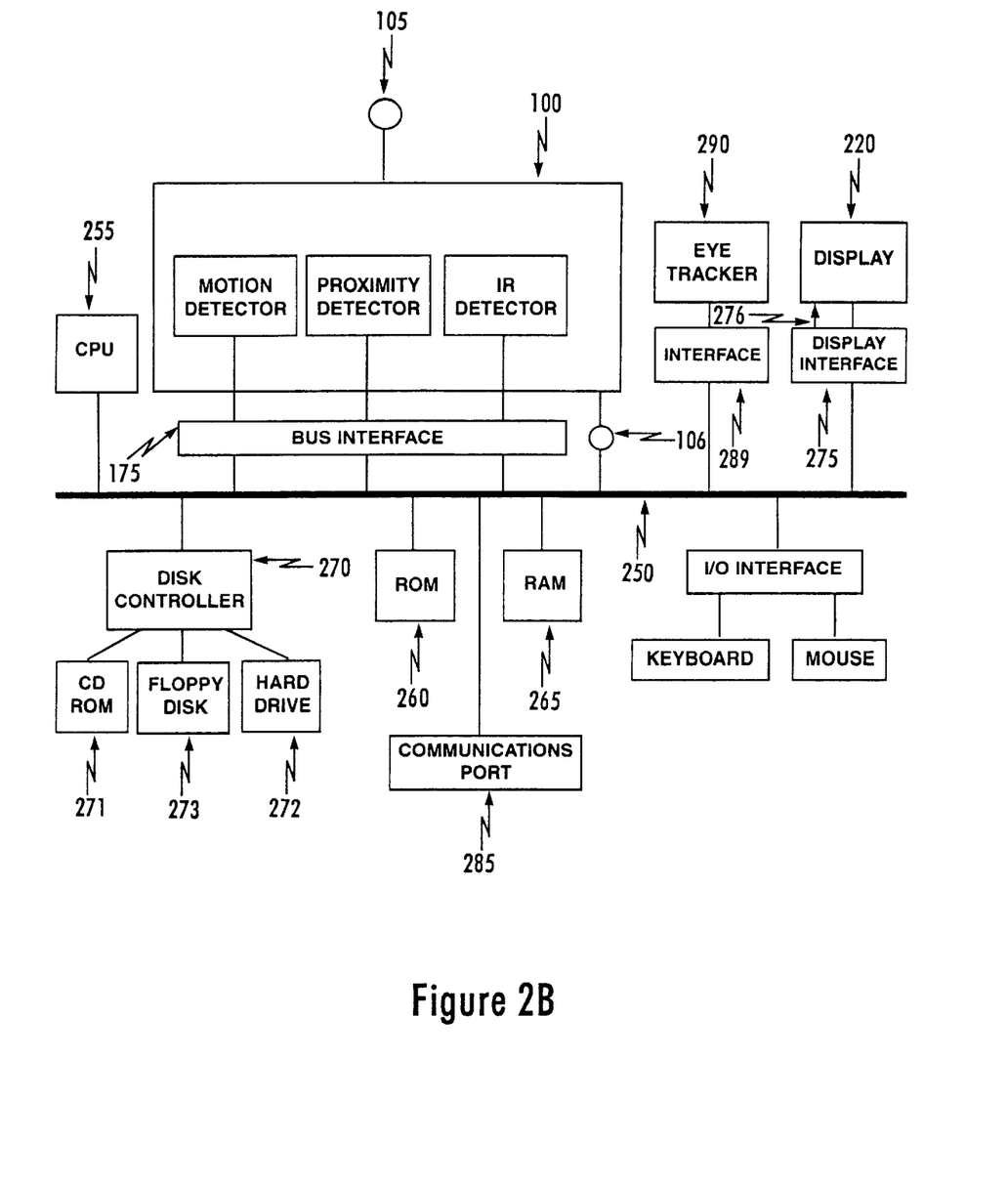
FIG. 2B is an illustration of an exemplary computer architecture incorporating the invention.

FIG. 2B is a block diagram of the internal hardware of the computer of FIG. 2A. A bus 250 serves as the main information highway interconnecting the other components of the computer. CPU 255 is the central processing unit of the system, performing calculations and logic operations required to execute a program. Read only memory (260) and random access memory (265) constitute the main memory of the computer. Disk controller 270 interfaces one or more disk drives to the system bus 250. These disk drives may be floppy disk drives, such as 273, internal or external hard drives, such as 272, or CD ROM or DVD (Digital Video Disks) drives such as 271. A display interface 275 interfaces display 220 and permits information from the bus to be displayed on the display. Communications with external devices can occur over communications port 285.

An automatic power-up/power-down circuit 100 is connected to the bus 250 over bus interface 175. Power from power source 105 is utilized to power-up the computer and the bus structure over terminal 106. The outputs from the motion detector, proximity detector and IR detector of the automatic power-up/power-down circuit 100 are connected to the bus and are utilized as more fully described hereinafter.

An eyetracker 290 is interfaced to the bus over interface 289 and provides information for control of the power and described more hereinafter. The display 220 is interfaced to the computer bus over display interface 275. A separate control line 276 is shown between the display interface 275 and the display 220. This line is utilized to control the intensity of illumination of images on the surface of the display. It effectively serves as a power control for the display device.

Figure 2C:
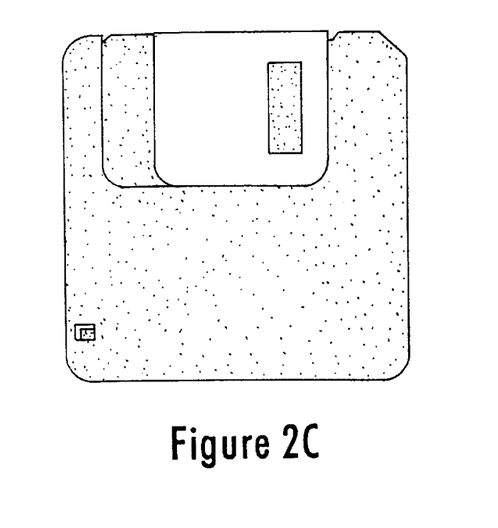
FIG. 2C is an illustration of an exemplary memory medium used to store computer programs and data of the invention.

FIG. 2C illustrates an exemplary memory medium which can be used with drives such as 273 in FIG. 2B or 210A in FIG. 2A. Typically, memory media such as a floppy disk, or a CD ROM, or a Digital Video Disk will contain, inter alia, program information for controlling the computer to enable the computer to perform its testing and development functions in accordance with the invention.

Figure 3:
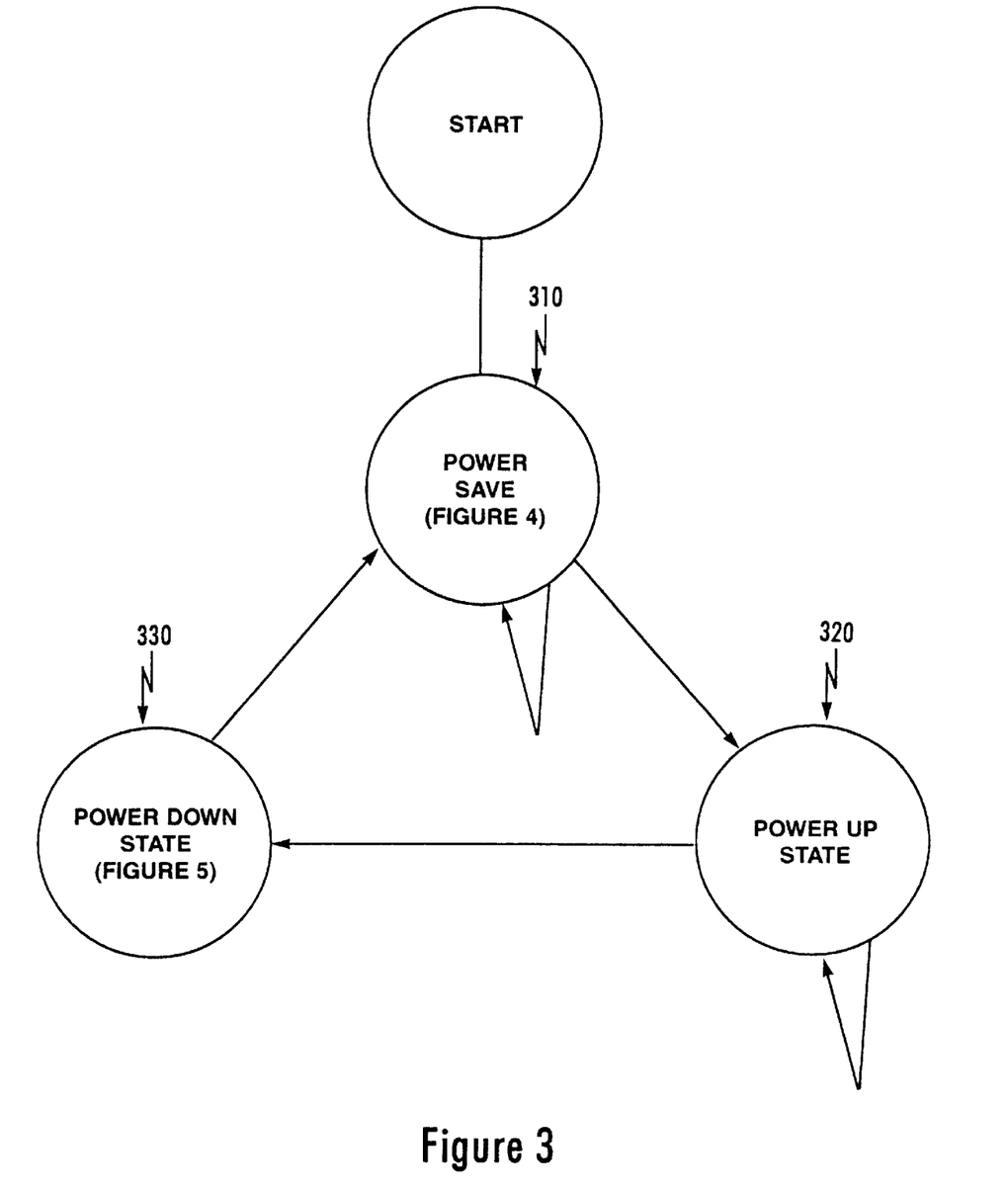
FIG. 3 is a state transition diagram of a computer process used in accordance with the invention.

FIG. 3 is a state transition diagram showing the control processes used in accordance with the invention. The process begins with a power save state 310 which is described more in detail in FIG. 4. From the power save state, the state can transition either to a power-up state 320 or return to itself. From power-up state 320, the invention can transition to a power-down state shown more in detail in FIG. 5 (330) or return to itself.

Figure 4:
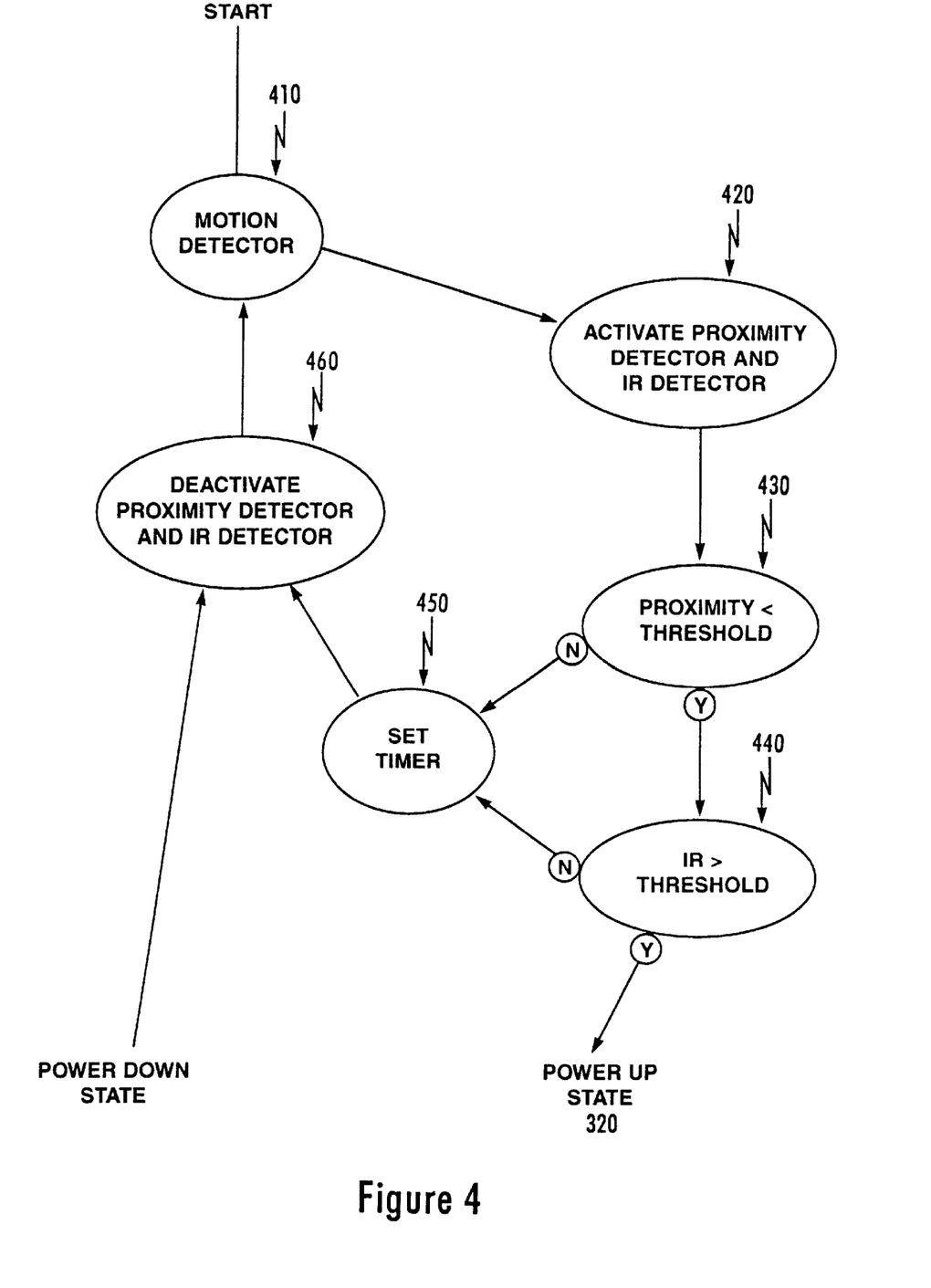
FIG. 4 is a state transition diagram of a power save process shown in FIG. 3.

Turning to FIG. 4, if motion detector 110 shown in FIG. 1 detects motion (410), the proximity detector and the IR detector are activated (420). If they are both activated, then a check is made to determine if proximity of the object whose motion is detected is less than the threshold (430) and then a check made to see if the IR level is greater than a threshold (440). If it is, switch 145 shown in FIG. 1 is closed and power is applied to terminal 106 to power-up the external device thus entering the power-up state 320 shown in FIG. 3. States 430 and 440 can transition to "set timer" state 450 if their conditions are not met. After timer 450 times out, it will transition to state 460 where the proximity detector and the IR detectors will be deactivated. State 460 will transition back to state 410 and the process begin again. State 460 may also be entered externally from the power-down state 330 shown in FIG. 3.

Figure 5:
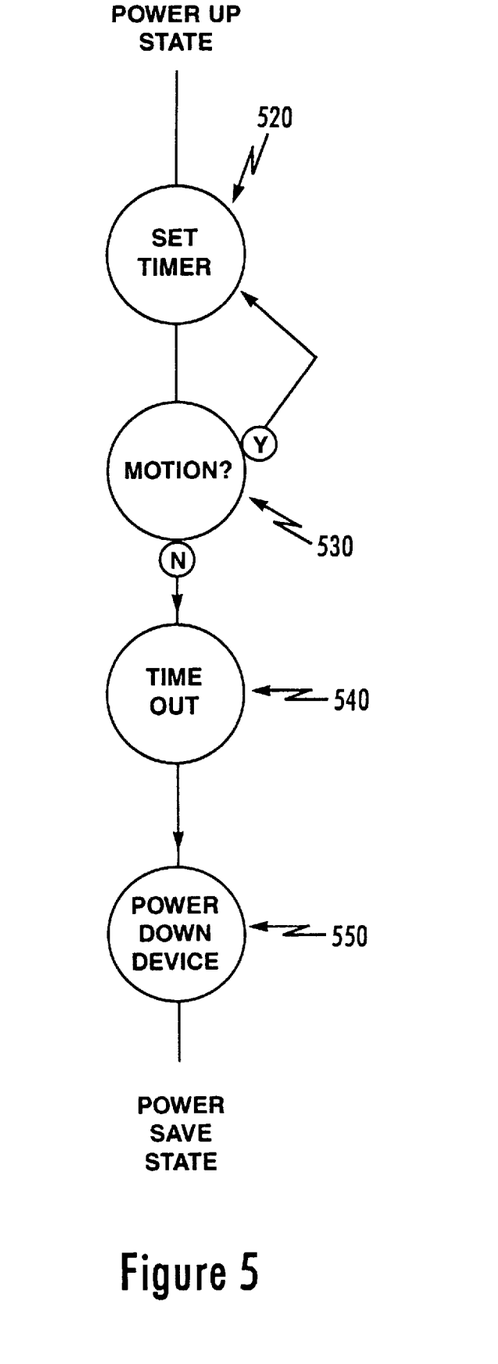
FIG. 5 is a flow chart of a power down process shown in FIG. 3.

FIG. 5 shows more in detail the power-down state transition diagram 330 of FIG. 3. When entered from the power-up state 320 of FIG. 3, a set timer state 520 is entered which corresponds to power-down timer 150 shown in FIG. 1. If motion is detected (state 530) timer 520 is reset. If no motion is detected, state 540 results from a timeout which triggers a power-down device state 550. This corresponds to resetting of flip-flops 140 and 115 if FIG. 1. State 550 transitions back to power save state 300 shown in FIG. 3 and more specifically to state 460 within that state.

Figure 6:
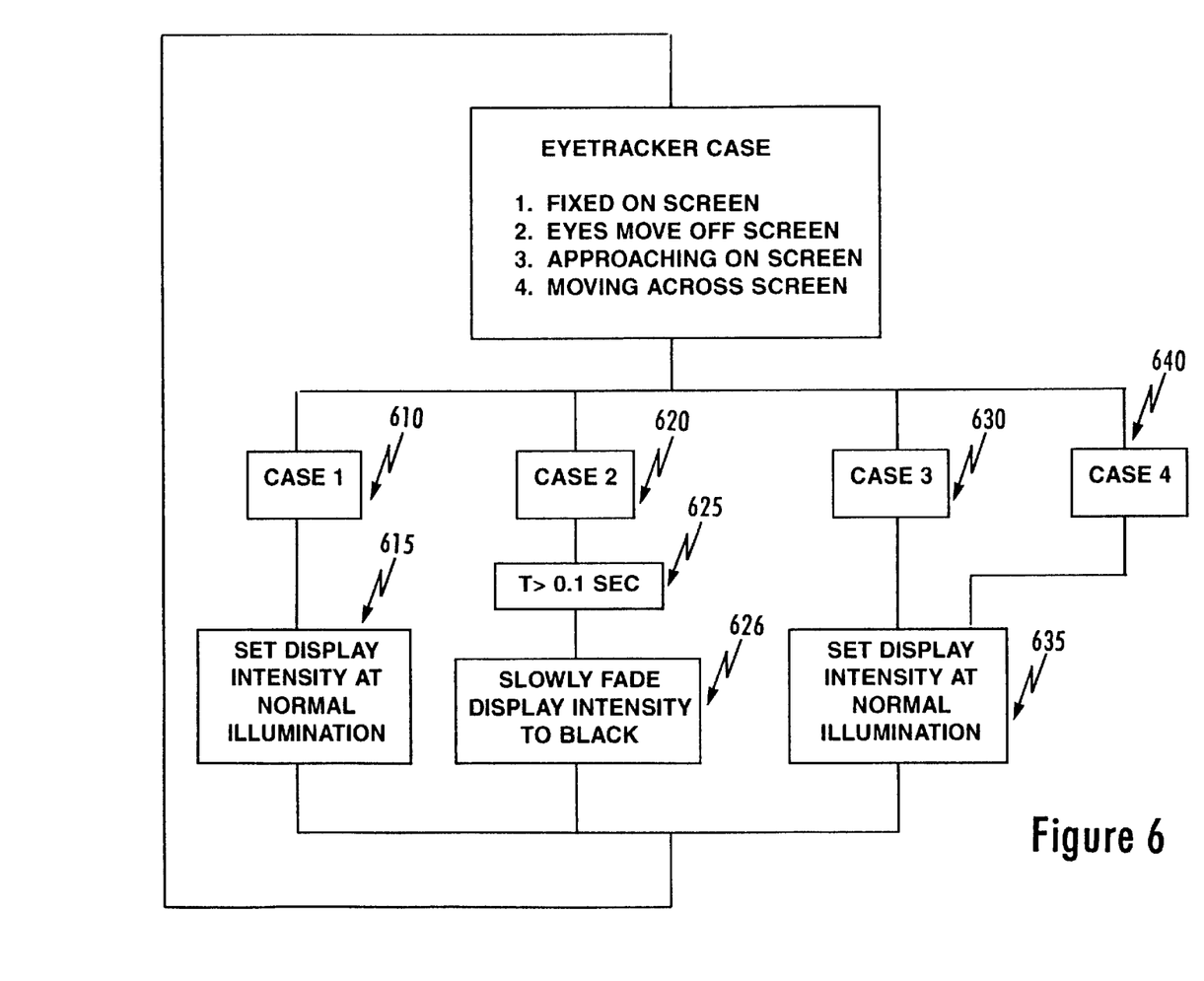
FIG. 6 is a flow chart of one power control process used as part of the invention.

FIG. 6 is a flow chart of a one power control process used as part of the invention. Eyetracker 290, shown in FIG. 2B is utilized to control the illumination of images on the display 220. How this is done is shown in FIG. 6. The eyetracker outputs are processed to distinguish four conditions shown in FIG. 6, namely:

1. Whether the eyes are fixed at a point on the screen,
2. Whether the eyes move off the screen,
3. Whether the eyes are approaching the screen from a position off the screen, and
4. Whether the eyes are moving across the screen.

These four cases are distinguished by seperate processing branches shown in FIG. 6. When the eyetracker determines that the eyes are fixed on the screen, case 1 (610) obtains and the display intensity is set at normal illumination (615).

In case number 2 (620), when the eyes move from the screen to a point off the screen, a time interval of, preferably, 1/10 of a second (625) is set. If that time expires without the eyes returning to the screen, the screen will slowly fade the display intensity to black (626). In the embodiment shown in FIG. 6, once the eyes have been off the screen for a period of time greater than the time set in item 625, cases 3 and 4 are treated identically. That is, whether the eyes are approaching the screen or moving across the screen without fixing on the screen, the display intensity will resume normal illumination as quickly as possible. Normal illumination will thus continue until such time as the eyes leave the screen again.

Figure 7:
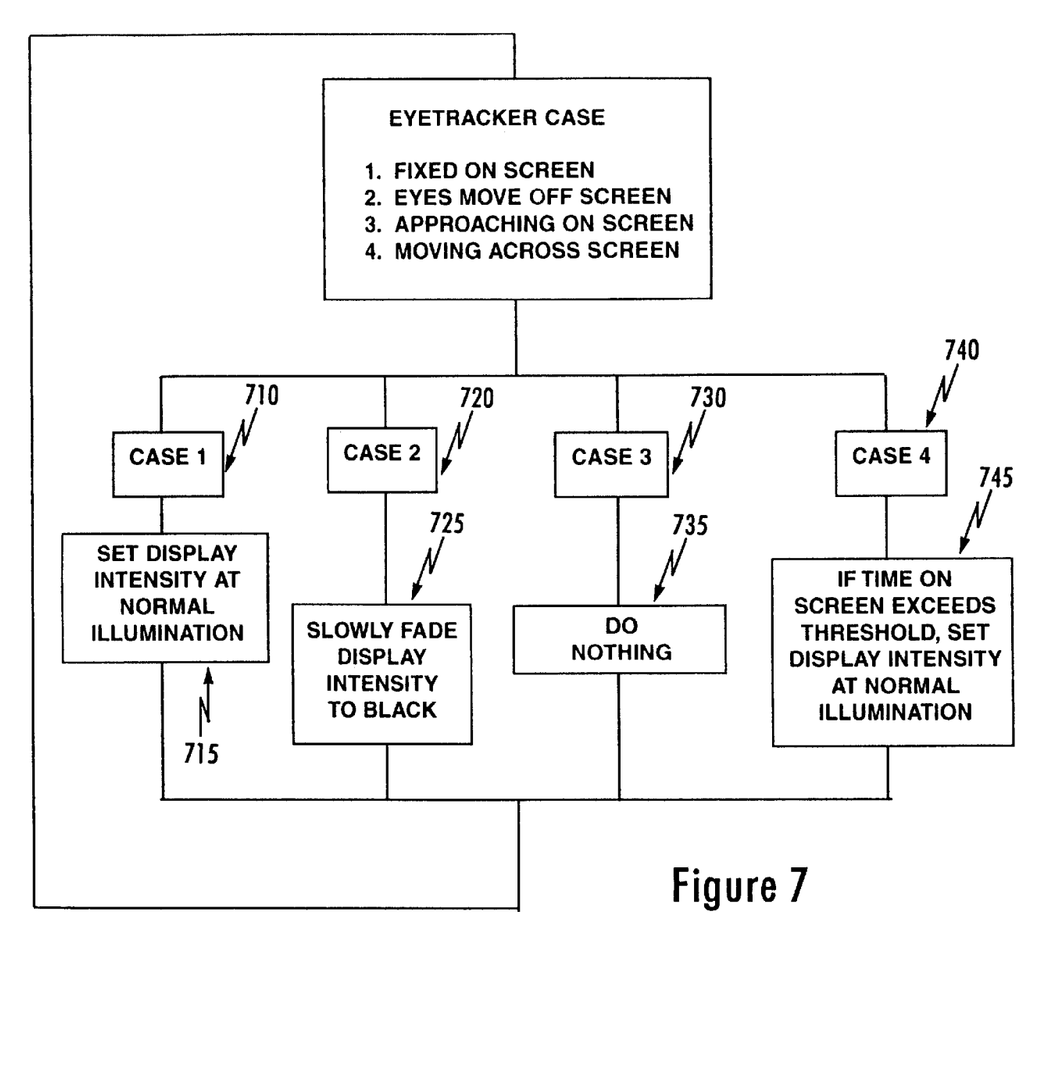
FIG. 7 is a flow chart of another power control process used in accordance with the invention.

The embodiment shown in FIG. 7, is identical for cases 1 and 2 as that shown in FIG. 6. However, cases 3 and 4 are treated separately. In case 3, where the eyes are approaching the on-screen condition, in this embodiment, nothing happens. That is, the screen remains blank. However, case 4 results in measurement of the time that the eyes are on the screen. If the time the eyes are on the screen exceeds some threshold, the display intensity is resumed at normal illumination as quickly as possible.

Thus, in accordance with the invention, electrical devices powered by energy sources of finite capacity can utilize the energy available to the maximum extent possible and reduce energy waste to a minimum.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

We claim:

1. Apparatus for automatically applying power to a computer controlled device, comprising:
   a. a motion detector;
   b. a proximity detector, activated by said motion detector detecting motion;
   c. a switch connected to a source of power and to said computer controlled device and controlled by said motion detector and said proximity detector for applying power to said computer controlled device when the proximity detector detects an object within a predetermined distance from the computer controlled device while activated by said motion detector.

2. The apparatus of claim 1, further including a power off timer, activated when power is applied to said computer controlled device and reset by said motion detector detecting motion for controlling said switch to remove power from said computer controlled device when the timer times out.

3. The apparatus of claim 1, in which said computer controlled device is a computer having a display.

4. The apparatus of claim 3, further comprising an eyetracker for limiting power consumption when the eyetracker indicates that a computer user has directed user attention to something other than said display.

5. A method for automatically applying power to a computer controlled device, comprising the steps of:
   a. providing an element for performing the step of detecting motion;
   b. providing an element for performing the step of detecting proximity of objects to said device; and
   c. providing an element for performing the step of applying power to said device when an object is within a predetermined distance from the computer controlled device within a predetermined period of time after motion has been detected.

6. A computer system comprising:
   a. a network;
   b. a plurality of computers connected to said network;
   c. at least a particular one of said plurality of computers equipped with
      c.1. a motion detector;
      c.2. a proximity detector, activated by said motion detector detecting motion; and
      c.3. a switch connected to a source of power and to said one of the plurality of computers and controlled by said motion detector and said proximity detector for applying power to said at least a particular one of said plurality of computers when the proximity detector detects an object within a predetermined distance from the said at least a particular one of said plurality of computers while activated by said motion detector.

7. A computer program product for applying power to a computer controlled device, comprising:
   a. a computer readable memory medium; and
   b. a computer program including:
      b.1 instructions for detecting motion;
      b.2 instructions for detecting proximity of objects to said device; and
      b.3 instructions for applying power to said device when an object is within a predetermined distance from the computer controlled device within a predetermined period of time after motion has been detected.

\* \* \* \* \*